Dec. 8, 1964  W. M. BAGGETT ETAL  3,160,193
HOLLOW TIRE CORD
Filed Sept. 25, 1962
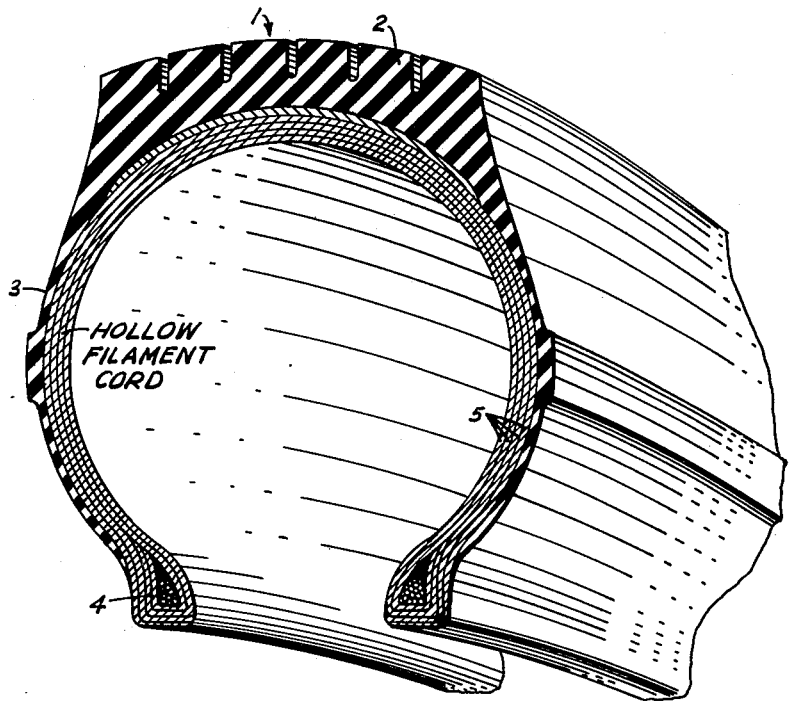
Fig.1
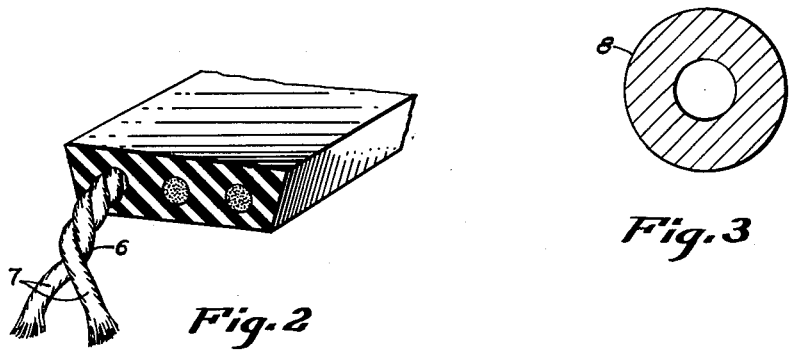
Fig.2
Fig.3
INVENTORS.
GEORGE B. HUGHEY
WILLIAM M. BAGGETT
BY  JOSEPH A. HAFFORD
Stanley M. Tarter
ATTORNEY

United States Patent Office 3,160,193
Patented Dec. 8, 1964

3,160,193
HOLLOW TIRE CORD
William M. Baggett, Pensacola, Joseph A. Hafford, Gulf Breeze, and George B. Hughey, Pensacola, Fla., assignors to Monsanto Company, a corporation of Delaware
Filed Sept. 25, 1962, Ser. No. 226,088
7 Claims. (Cl. 152—359)

This invention relates to textile cords and to resilient articles reinforced with such cords. In particular, this invention relates to an improved hollow tire cord primarily adapted to extent the flex-life of rubber tires by imparting a higher fatigue resistance property thereto.

The textile cord embodying the invention will be discussed as it relates to rubber tires for clarity and simplicity reasons. However, it will be understood that other applications are foreseeable in the embodiment of such articles as belts, expansible springs and the like.

Strength, durability and fatigue resistance in tires, as well as other reinforced resilient articles, are obtained mostly from the body reinforcement or the so-called carcass of the tire. The carcass is a fabric of composite plies of cords embedded in the rubber of a tire. "Fatigue resistance" as used herein refers to the ability of a tire cord to resist degradation when it is forced to undergo repeated compression and tension stresses under impact, high temperature and flexure loads.

In the tire industry, there is a continuing demand for stronger tires to withstand faster speeds, heavier impact loads, more severe flexing and higher operating temperatures required as a consequence of the changing pattern of use and design of automobiles, airplanes, tractors and other vehicles equipped with tires.

Tire cords are constantly being improved to provide better and safer tires to meet the severe strains to which they are subjected under modern operating conditions. Improvements in properties of tire cord, in the composition of the cord, in the arrangement thereof, and in other areas have been suggested. Notwithstanding these advancements, a quest remains for the development of more satisfactory and safer tires.

In an endeavor to further improve tire cords and tires, it was noted that conventional tire cords were composed of filaments, of nylon or rayon composition with polyester being recently introduced, which are solid in cross section. Solid filament yarns have an inherent brittleness and a tendency to break due to uneven quenching of the filaments while they are processed. The outer parameters of the filaments are cooled more and at a faster rate than the interior or core portion. Consequently, when the yarn is incorporated in a tire cord and subjected to impact, flex, and temperature stresses, the stresses are not absorbed evenly and the cords break. Hollow filaments, however, can be more evenly quenched and are therefore more uniformly stressed so that bending and flexing forces applied are evenly absorbed. With this in mind, hollow filament cords were constructed and applied in the reinforcement of resilient articles with unexpected results being obtained.

It is, therefore, an object of this invention to provide an improved reinforcing cord made of hollow filaments for use in production of reinforced resilient articles.

Another object is to provide a reinforcing cord which has increased fatigue longevity over conventional types.

Another object is to provide a stronger, more durable rubber tire reinforced with a tire cord comprising hollow nylon filaments.

Other objects and advantages of the invention will be appreciated when reference is made to the more detailed description which follows and to the accompanying drawing wherein:

FIGURE 1 is a perspective view of a section removed from an improved tire constructed according to the invention having hollow filament tire cords;

FIGURE 2 is a perspective view of a section removed from a resilient article of manufacture, a belt, constructed according to the invention and incorporating hollow filament cords; and FIGURE 3 is a cross section view of a single hollow filament of the type used in the improved cord.

According to the invention, in brief, a textile cord is provided composed of twisted multi-continuous filaments having axially extending holes and adapted to be used in the production of resilient structures such as, for example, tire cord to produce longer lasting, fatigue resistant rubber tires. The hollow filaments are preferably composed of nylon; and it is preferred that the cross-sectional area of the hole be about 0.10 to 30 percent of the cross-sectional area bounded by the external perimeter of a given filament.

Referring now to the drawing, FIGURE 1 illustrates a rubber tire 1 constructed according to the invention. The tire 1 has the usual components, tread 2, sidewalls 3, bead 4, and carcass comprising layers of plies of tire cord 5.

Each ply of tire cord 5 comprises a plurality of cords 6 each made up of a plurality of yarn ends 7 such as is shown in FIGURE 2. Each yarn end 7 is comprised of a plurality of hollow filaments 8 of the type shown in FIGURE 3.

Preferably, the hollow filaments 8 in each ply 7 of tire cord fabric are made from a polymer such as nylon–66 or nylon–6. It has been found that a tire having a carcass comprised of hollow filament cords offers more residual strength, a higher factor of durability or fatigue resistance and a longer flex-life than a similar tire constructed with conventional solid filament cords when operated under the same control conditions. Because of the advantages of the hollow filament type cord, it is possible to make lighter and thinner tires which are desirable from an engineering and cost standpoint.

As indicated above, the cross-sectional area of the voids of the filaments should be about 0.10 to 30 percent of the cross-sectional area bounded by the external perimeter of the filaments. Below 0.10 percent the filaments do not exhibit enhanced flex-life but are similar to solid filaments. Above 30 percent the filaments are difficult to produce and the walls thereof are too thin. The best results are obtained when the cross-sectional area of the voids of the filaments are approximately 20 percent.

The following examples illustrate the invention:

EXAMPLE I

Two ends of solid cross section nylon–66 yarn, each having 138 filaments of 840 total denier, were spun from respective spinnerets. Each end was drawn a predetermined amount to obtain optimum molecular orientation and taken up by known practice on a take-up device. Thereafter, each end was twisted 11.8 turns per inch. The two ends were then plied and twisted 12.1 turns per inch to form a greige cord having a cord denier of 1913. The elongation at break of the greige cord was 23.2 percent while the tenacity was 6.6 grams per denier.

The greige cord was then latex dipped and hot stretched in the usual manner to form a so-called hot stretched, dipped cord. After dipping and hot stretching the cord had a twist of 11.04 turns per inch and an elongation at break of 18 percent.

Some of the dipped cord was then subjected to a conventional desiccation test at 350° F. for four hours to determine thermal degradation thereof. The result of the test showed a retained tensile strength of 82 percent and an elongation at break of 20.3 percent.

The hot stretched, dipped cord was tested for adhesion according to conventional testing procedures. The force required to separate the cord from the rubber stock was measured and the force required was given a 100 percent reference evaluation.

The solid filament cord was also tested for fatigue resistance or durability with a Goodyear-Mallory tube tester. According to this procedure a rubber tube of specified construction was made from the solid filament cord and rubber stock. The tube was subjected to tension-compression strains until rupture or blow-out occurred. The number of cycles to the blow-out or fatigue point was recorded and was given a reference evaluation of 100 percent.

EXAMPLE II

Two ends of hollow cross section nylon-66 yarn, each having 138 filaments of 840 total denier, were spun from respective spinnerets. Each end was drawn a predetermined amount to obtain optimum molecular orientation and taken up by known practice on a take-up device in like manner to the solid filament yarn. The cross-sectional area of the axial hold in the filaments averaged 12.5 percent of the cross-sectional area bounded by the external perimeter of the filaments. Thereafter, each end was twisted 12.2 turns per inch. The two ends of the hollow filament yarn were then plied and twisted 12.1 turns per inch to form a greige cord having a cord denier of 1987. The elongation at break of the greige cord was 22.2 percent while the tenacity was 6.4 grams per denier.

The greige cord was then latex dipped and hot stretched in the usual manner to form a so-called hot stretched, dipped cord. The hot stretched, dipped cord then had a twist of 11.7 turns per inch and an elongation at break of 18.3 percent.

Some of the dipped cord was then subjected to a conventional thermal degradation desiccation test for four hours. The result of the test showed a retained tensile strength of 82 percent and an elongation at break of 20.7 percent.

The hot stretched, dipped cord was tested for adhesion by the same test applied to the solid filament cord. The ratings of the two cords for adhesion were substantially similar.

The hollow filament cord was used in the construction of a tube and tested for fatigue resistance with a Goodyear-Mallory tube tester as was the solid filament cord of Example I. The number of cycles to the blow-out or fatigue point was recorded and compared with the cycles of the control or solid filament cord. The tube constructed with the hollow filament cord when compared with the results of the solid filament cord yielded a 20 percent increased fatigue resistance or durability. The procedure used for testing the durability of the tubes on the Goodyear-Mallory tester was according to ASTM standards as outlined in ASTM Standards on Textile Materials, 32nd Ed., pp. 374–378.

The following table summarizes the test data of both examples.

Table 1

| | Hollow Filament | Solid Filament |
|---|---|---|
| Greige Cord: | | |
| Tensile (Pound) | 28.0 | 28.0 |
| Tenacity (g.p.d.) | 6.4 | 6.6 |
| Elongation at 10 Pounds (percent) | 11.0 | 10.5 |
| Elongation at 20 Pounds (percent) | 15.9 | 15.0 |
| Elongation at Break (percent) | 22.2 | 23.2 |
| Energy (g.p.d. x E/2) | 71 | 77 |
| Denier | 1,927 | 1,858 |
| MR (percent) | 3.1 | 3.0 |
| Ply Twist (t.p.i.) | 12.2 | 11.8 |
| Cable Twist (t.p.i.) | 12.1 | 12.1 |
| Dipped Cord: | | |
| Tensile (Pound) | 29.2 | 28.9 |
| Elongation at 10 Pounds (percent) | 6.9 | 6.7 |
| Elongation at 20 Pounds (percent) | 11.2 | 10.7 |
| Elongation at Break (percent) | 18.3 | 18.0 |
| Denier | 1,987 | 1,913 |
| Cable Twist (t.p.i.) | 11.7 | 11.04 |
| Gauge (inches) | 0.021 | 0.021 |
| Contraction (percent)— | | |
| 100° C | 1.7 | 1.8 |
| 125° C | 3.2 | 3.2 |
| 150° C | 5.6 | 5.3 |
| Growth (percent) | 7.1 | 6.9 |
| Adhesion, lb./in | 34.9 | 34.7 |
| Four Hours at 350° F. and Desicc.: | | |
| Tensile (Pounds) | 24.1 | 23.8 |
| Tensile Retained (percent) | 82 | 82 |
| Elongation at Break (percent) | 20.7 | 20.3 |
| Durability (Fatigue Resistance), percent | 120 | 100 |

It is to be noted that both yarns, solid and hollow, were processed simultaneously using the same polymer and under identical conditions. In practice it is difficult to produce yarn ends which are exactly similar in denier. The slightly different denier between the solid filament yarn as compared to the hollow filament yarn is within the normal limits prescribed for conventional yarns used in tire cord construction.

A significant improvement is seen in the 20 percent increase in fatigue resistance of the tube having hollow filament cord therein over the one having solid filament cord as reinforcement.

Other evaluations of the hollow filament cord and solid filament cord, as can be seen from the table given above, showed substantially similar performance characteristics.

The following example further illustrates the invention:

EXAMPLE III

Two sets of tires of identical structure as in size and ply were made according to standard processes. One set of tires was made incorporating solid filament cord of the type described in Example I and another set of tires was made of hollow filament cord of the type described in Example II. Both sets of tires were tested on a Bureau of Standards indoor wheel machine to evaluate mileage performance. A new tire was used for each test and each tire was run continuously until rupture or failure occurred. Conditions used during this test were 50 percent tire and rim recommended loading, 30 p.s.i.g. hot, 45 m.p.h. on smooth wheel at 100° F. ambient temperature. It was found that the tires made with hollow filament cord ran approximately 76 percent longer than did the tires made with solid filament cords. The following table summarizes the above tests.

Table 2

TIRE PERFORMANCE: MILEAGE

| | Solid Tire Cord | Hollow Tire Cord |
|---|---|---|
| 1 | 1,427 | 3,783 |
| 2 | 2,152 | 2,543 |

The hollow filament cord thus provides tires and other reinforced articles having a longer flex-life over tires constructed with solid filament cord. It is possible to produce tires which provide greater mileage at a reduction in cost when hollow filament cords are used in their construction. Hollow filaments permit better dissipation of heat and thus provide cooler operating temperatures in rubber tires. The opening in the hollow filament permits an even distribution of compressive stresses as the filament body can expand interiorly as well as exteriorly. This factor permits the production of a heavier denier per filament in large cords for the production of stronger cord and articles therefrom.

It is to be understood that variations and modifications are contemplated within the spirit of the invention and scope of the claims.

What is claimed is:

1. An improved high fatigue resistant cord for use as reinforcement in flexible structures, said cord comprising a plurality of plied and twisted continuous filaments having continuous axially extending holes.

2. An improved high fatigue resistant cord for use as reinforcement in flexible structures, said cord comprising a plurality of plied and twisted continuous filaments having continuous axially extending holes, the cross-sectional area of the holes being 0.10 to 30 percent of the cross-sectional area bounded by the perimeters of the filaments.

3. An improved high fatigue resistant cord as in claim 2, wherein the cross-sectional area of the continuous holes is about 20 percent of the total cross-sectional area of said filaments.

4. An improved high fatigue resistant cord as in claim 3, wherein said filaments are made of nylon.

5. An improved reinforced resilient fabric comprising an expansible body and a plurality of cords embedded within said expansible body, each of said cords having a plurality of plied and twisted continuous filaments with continuous axially extending holes, the cross-sectional area of the holes being 0.10 to 30 percent of the cross-sectional area bounded by the perimeters of said filaments.

6. An improved carcass for a rubber tire having tread and side-walls superimposed thereon, said carcass comprising a plurality of composite fabric layers each having a plurality of cords embedded therein, said cords being formed from a plurality of continuous plied and twisted filaments having continuous axially extending holes for improving the flex-life of the rubber tire.

7. An improved carcass for a rubber tire as in claim 6, wherein said filaments are made of nylon and the cross-sectional area of the holes is 0.10 to 30 percent of the cross-sectional area bounded by the perimeters of the filaments.

References Cited in the file of this patent

UNITED STATES PATENTS

| | | |
|---|---|---|
| 1,144,079 | Tew | June 22, 1915 |
| 1,689,168 | Dickinson | Oct. 23, 1928 |
| 2,171,805 | Picard | Sept. 5, 1939 |
| 2,273,200 | Hoff | Feb. 17, 1942 |
| 2,965,925 | Dietzsch | Dec. 27, 1960 |
| 2,991,818 | Gay et al. | July 11, 1961 |

FOREIGN PATENTS

| | | |
|---|---|---|
| 865,843 | Great Britain | Apr. 19, 1961 |